US012431100B2

(12) United States Patent
Wooster et al.

(10) Patent No.: US 12,431,100 B2
(45) Date of Patent: Sep. 30, 2025

(54) ASYNCHRONOUS CONTROL OF A BACKLIGHT FOR A LIQUID CRYSTAL DISPLAY

(71) Applicant: Intel Corporation, Santa Clara, CA (US)

(72) Inventors: Roland Peter Wooster, Folsom, CA (US); Geethacharan Rajagopalan, Gold River, CA (US); John Lang, Hillsboro, OR (US); Partha Robert Choudhury, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 768 days.

(21) Appl. No.: 17/561,863

(22) Filed: Dec. 24, 2021

(65) Prior Publication Data

US 2022/0122553 A1 Apr. 21, 2022

(51) Int. Cl.
*G09G 3/34* (2006.01)
*G09G 5/10* (2006.01)

(52) U.S. Cl.
CPC ............ *G09G 3/3426* (2013.01); *G09G 5/10* (2013.01); *G09G 2310/08* (2013.01); *G09G 2320/0626* (2013.01)

(58) Field of Classification Search
CPC .... G09G 3/3426; G09G 5/10; G09G 2310/08; G09G 2320/0626; G09G 3/2096; G09G 2320/0653; G09G 2360/16; G09G 2370/08
See application file for complete search history.

(56) References Cited

U.S. PATENT DOCUMENTS

| | | | | |
|---|---|---|---|---|
| 8,599,183 | B2 * | 12/2013 | Yeo | G09G 3/3648 345/102 |
| 2003/0137521 | A1 * | 7/2003 | Zehner | G02F 1/167 345/589 |
| 2006/0103621 | A1 * | 5/2006 | Feng | G09G 3/3648 345/102 |
| 2006/0208999 | A1 * | 9/2006 | Lee | G09G 3/3426 345/102 |
| 2011/0164073 | A1 | 7/2011 | Jung | |
| 2011/0175935 | A1 * | 7/2011 | S | H05B 45/20 345/213 |
| 2011/0227940 | A1 * | 9/2011 | Neal | G09G 3/3426 345/589 |
| 2014/0049572 | A1 * | 2/2014 | Sacchetto | G09G 3/20 345/691 |

(Continued)

FOREIGN PATENT DOCUMENTS

| | | | |
|---|---|---|---|
| CN | 105810159 | A | 7/2016 |
| KR | 20120129636 | A | 11/2012 |

OTHER PUBLICATIONS

PCT/US2022/051075 International Search Report and Written Opinion of the International Searching Authority dated Apr. 5, 2023 (9 pages).

*Primary Examiner* — Antonio Xavier
(74) *Attorney, Agent, or Firm* — Banner & Witcoff Ltd.

(57) ABSTRACT

Particular embodiments described herein provide for an electronic device that includes a liquid crystal display, a backlight for the liquid crystal display, a timing controller (TCON), and a display engine located outside of the TCON, where the display engine asynchronously sends image data to the TCON and backlight control data to the backlight.

20 Claims, 7 Drawing Sheets

(56) References Cited

U.S. PATENT DOCUMENTS

| | | | | |
|---|---|---|---|---|
| 2015/0228250 | A1* | 8/2015 | Chen | G02F 1/133603 345/102 |
| 2015/0371580 | A1* | 12/2015 | Yashiki | G09G 3/3413 345/691 |
| 2018/0296912 | A1* | 10/2018 | Hicks | A63F 13/355 |
| 2019/0164506 | A1* | 5/2019 | Wu | G02F 1/133602 |
| 2019/0295477 | A1* | 9/2019 | Tada | G09G 3/3611 |
| 2020/0320958 | A1* | 10/2020 | Sinha | G09G 5/006 |
| 2022/0122553 | A1 | 4/2022 | Wooster et al. | |
| 2023/0037248 | A1* | 2/2023 | Siddiqui | G02F 1/1323 |

* cited by examiner

126

| | | To | | | | |
|---|---|---|---|---|---|---|
| | | Black | Dark-Grey | Mid-Grey | Light-Grey | White |
| From | Black | | 29.2 | 33.8 | 27.6 | 14.7 |
| | Dark-Grey | 11.2 | | 30.7 | 25.5 | 13.7 |
| | Mid-Grey | 10.9 | 16.9 | | 22.9 | 12.8 |
| | Light-Grey | 11.9 | 18.4 | 14 | | 12.4 |
| | White | 13.6 | 19.6 | 19.3 | 11.6 | |

FIGURE 5

ASYNCHRONOUS CONTROL OF A BACKLIGHT FOR A LIQUID CRYSTAL DISPLAY

TECHNICAL FIELD

This disclosure relates in general to the field of computing, and more particularly, to asynchronous control of a backlight for a liquid crystal display.

BACKGROUND

End users have more electronic device choices than ever before. A number of prominent technological trends are currently afoot and these trends are changing the electronic device landscape. Some of the technological trends involve a device that includes a display.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 5 is a simplified block diagram illustrating example details of a portion of a system to enable asynchronous control of a backlight for a liquid crystal display, in accordance with an embodiment of the present disclosure;

Figure 1:
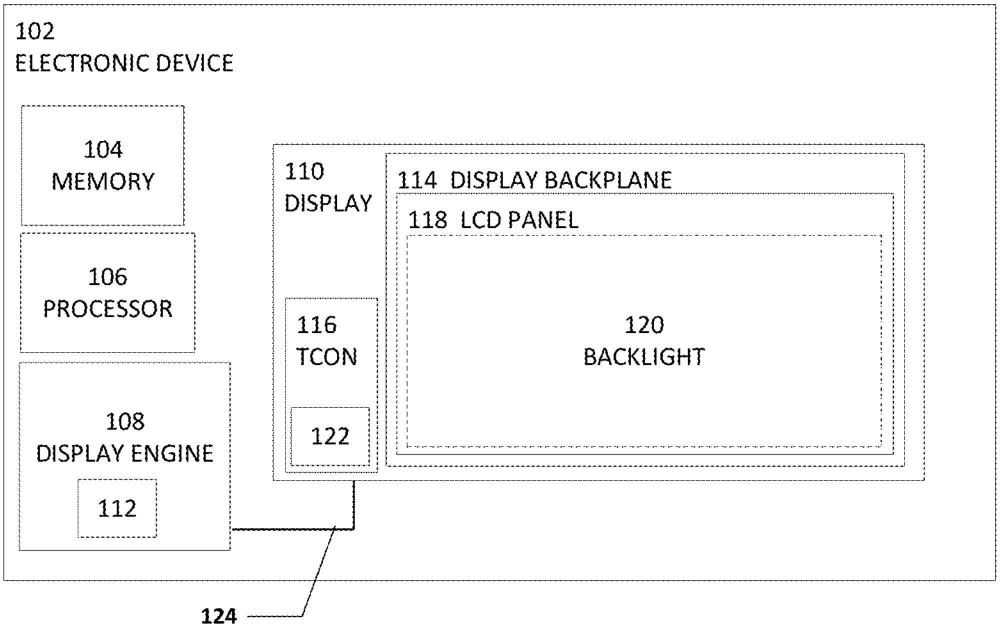
FIG. 1 is a simplified block diagram of a system to enable asynchronous control of a backlight for a liquid crystal display, in accordance with an embodiment of the present disclosure.

The FIGURES of the drawings are not necessarily drawn to scale, as their dimensions can be varied considerably without departing from the scope of the present disclosure.

DETAILED DESCRIPTION

The following detailed description sets forth examples of apparatuses, methods, and systems relating to enabling asynchronous control of a backlight for a liquid crystal display in accordance with an embodiment of the present disclosure. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In an example, an electronic device can include a liquid crystal display (LCD), a backlight for the LCD, a backlight controller, a timing controller (TCON), and a display engine located outside of the TCON. The display engine can be configured to asynchronously send image data to the TCON and backlight control data to the backlight. This allows the display engine to drive the backlight directly and asynchronously from the display engine rather than delegating to task of driving the backlight to the video-frame-rate-synchronous TCON. For example, the display engine can determine a gray to gray transition time for the LCD, determine a backlight level adjustment for the backlight, communicate video data to the TCON, where the video data include instructions for the gray to gray transition for the liquid crystal display, and communicate the backlight level adjustment to a backlight controller.

In some current systems, the backlight is updated synchronously with the video frame, so as each video frame is updated, both the backlight, and the LCD transparency level would be updated. However, while the backlight changes luminance level in 10's or 100's of nanoseconds, the LCD response time to transition to a new transparency level is almost a million times slower taking 10's of milliseconds. In an illustrative example, if the backlight transitioned from 20 nits to 700 nits in nanoseconds but the LCD transparency level did not complete transitioning for 20 ms due to the slower response time of the LCDs, there will be a period where areas of darkness will be as bright as the brightest pixel on the display. By using the display engine to asynchronously control the backlight, the backlight can be operated at a higher refresh rate than the video signal to align the LCD and backlight response speeds and help prevent flicker while enabling a significantly more aggressive application of local dimming.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment. The appearances of the phrase "for example," "in an example," or "in some examples" are not necessarily all referring to the same example. The term "about" includes a plus or minus twenty percent (±20%) variation. For example, about one (1) millimeter (mm) would include one (1) mm and ±0.2 mm from one (1) mm.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur. Reference to "one example" or "an example" in the present disclosure means that a particular feature, structure, or characteristic described in connection with the embodiment is included in at least one example or embodiment. The appearances of the phrase "in one example" or "in an example" are not necessarily all referring to the same examples or embodiments.

FIG. 1 is a simplified block diagram of an electronic device 102 configured to enable asynchronous control of a backlight for a liquid crystal display, in accordance with an embodiment of the present disclosure. In an example, the electronic device 102 can include memory 104, one or more processors 106, a display engine 108, and a display panel 110. The display engine 108 can include a display frame buffer 112. The display panel 110 can support high dynamic range and includes a display backplane 114, a timing controller (TCON) 116, a liquid crystal display panel 118, and a backlight 120. The TCON 116 can include a remote frame buffer 122. The display engine 108 can communicate with the display panel 110 using a display interface 124.

The display engine 108 can be a processor, a core of a processor, part of a core of a processor, a dedicated graphics processor, a core of a graphics processor, part of a core of a graphics processor, or a graphics engine. The display engine 108 may be located on a system on chip (SoC). The display engine 108 is responsible for transforming mathematical equations into individual pixels and frames and communicating the individual pixel and frames to the TCON 116. The TCON 116 is a timing controller on the display side. The TCON 116 receives the individual frames generated by the display engine 108, corrects for color and brightness, controls the refresh rate, controls power savings of display panel 110, touch (if enabled), etc. and is responsible for sending signals to the display backplane 114 that will generate the image on the display panel 110. The display backplane 114 can be the backplane that includes the materials and assembly designs used for the thin film transistors responsible for turning individual pixels on and off to enable an image to be shown on the display panel 110 for viewing by a user.

Various embodiments described herein generally involve techniques to communicate display data to one or more display devices through the display interface 124 (e.g., display port, HDMI, DVI, Thunderbolt®, or the like) that provides for the communication of display data between a computing device and a display device. For example, the display engine 108 may transmit display data to the display panel 110 using the display interface 124. The display data includes indications of an image to be displayed. For example, the display data includes information (e.g., RGB color data, etc.) corresponding to pixels of the display, that when communicated over the display interface 124, allows the display panel 110 to display an image (e.g., on a screen that has a backlight, etc.). Various display interfaces exist and the present disclosure is not intended to be limited to a particular display interface. Furthermore, the number of pixels and the displayable colors for each pixel varies for different displays. The number of pixels, the displayable colors, the display type, and other characteristics that may be referenced herein are referenced to facilitate understanding and are not intended to be limiting.

In some examples, the display panel 110 may include a number of TCONs (e.g., TCON 116) and drivers configured to receive the display data and cause the display panel 110 to display an image based on the display data. The TCON and drivers receive the display data, decode the display data and cause the display panel 110 to display an image corresponding to the display data (e.g., by illuminating pixels, etc.). The TCON and drivers may be configured to control or may be operative on the pixels within different portions of the display device. The display panel 110 can be a LCD panel that has high dynamic range and consumes a relatively low amount of power. The range between the very bright pixels and very dark pixels is the dynamic range and a high dynamic range means there is a relatively large difference or contract between very bright pixels and very dark pixels. If there is a uniform light, then the display would not have an acceptable level of contrast.

One way to achieve an acceptable level of contrast is to use local dimming across a plurality of zones to help achieve the very dark pixels. Local dimming is a process where there is not any light or a relatively low amount of light from the backlight 120 in a zone that should have very dark pixels. When a zone requires very bright pixels, relatively high levels of light can be generated by the backlight 120. Using local dimming can also save power as light from the backlight 120 is not being generated when it is not needed. To create more zones for local dimming, some systems use microLEDs where local dimming can be achieved at a micrometer size.

Current LCDs have a backlight behind a liquid crystal array. The liquid crystals have red, green, and blue filters and to obtain red light, the light from the backlight is filtered through the red filter, to obtain green light, the light from the backlight is filtered through the green filter, and to obtain blue light, the light from the backlight is filtered through the blue filter. A switch is used to control the light going through the filters.

Most current LCDs that include microLEDs use blue microLEDs on a backplane to create the backlight. The blue microLEDs are coated with a film of quantum dots that include both red and green conversion. The blue light from the blue microLEDs goes through the red and green quantum dot film and is converted into blue light beams, green light beams, and red light beams. A diffuser combines the blue light beams, green light beams, and red light beams to create the white color light beam necessary for an LCD backlight.

Current local dimming backlights are synchronously switched with the video frame rate. The inconsistency between LCD response speed and LED response speed results in tremendous flicker if aggressive adjustments are made to these inversely related hardware elements. The system can be configured to use asynchronous control of the backlight, also operating the backlight at a higher refresh rate than the video signal, to align the LCD and LED response speeds, thus helping to prevent user noticeable flicker and enabling a significantly more aggressive application of local dimming as compared to current systems where the TCON synchronously controls the LCD and the backlight. To asynchronously control the backlight, a direct connection from the display engine 108 to the backlight 120 is used rather than the TCON 116 being the source of control signals to the backlight 120.

It is to be understood that other embodiments may be utilized and structural changes may be made without departing from the scope of the present disclosure. Substantial flexibility is provided by an electronic device in that any suitable arrangements and configuration may be provided without departing from the teachings of the present disclosure.

For purposes of illustrating certain example techniques of electronic device 102, the following foundational information may be viewed as a basis from which the present disclosure may be properly explained. A number of prominent technological trends are currently afoot (e.g., more computing devices, more online video services, more Internet traffic, etc.), and these trends are changing the media delivery landscape. One change is the use of a display. Generally, a display is an output device that displays information in pictorial form to a user.

Early electronic computers were fitted with a panel of light bulbs where the state of each particular bulb would indicate the on/off state of a particular register bit inside the computer. This allowed the engineers operating the computer to monitor the internal state of the machine, and this panel of lights came to be known as the 'monitor'. As early monitors were only capable of displaying a very limited amount of information and were very transient, they were rarely considered for program output. Instead, a line printer was the primary output device and the monitor was limited to keeping track of the program's operation. Some of the first computer monitors used cathode ray tubes (CRTs). However, computer monitors that use CRTs are typically large heavy devices.

LCDs were created to reduce the size, weight, power consumption, etc. of displays. As computers became portable, the primary use of LCD technology as computer monitors was in laptops where the lower power consumption, lighter weight, and smaller physical size of the LCD justified the higher price of an LCD versus a CRT display. The dynamic range of early LCD panels was very poor, and although text and other motionless graphics were sharper than on a CRT, an LCD characteristic known as pixel lag caused moving graphics to appear noticeably smeared and blurry. Current LCDs offer better resolution and other advantages over CRT displays and most displays available today are LCDs.

Generally, a display (e.g., computer display, computer monitor, monitor, etc.) is an output device that displays information in pictorial form. The most common type of display is an LCD. There are multiple technologies that have been used to implement LCDs. LCDs are used in a wide range of applications, including LCD televisions, computer monitors, instrument panels, aircraft cockpit displays, and indoor and outdoor signage. Small LCD screens are common in portable consumer devices such as digital cameras, watches, calculators, and mobile telephones, including smartphones. LCD screens are also used on consumer electronics products such as DVD players, video game devices, and clocks. LCD screens have replaced heavy, bulky cathode ray tube (CRT) displays in nearly all applications. LCD screens are available in a wider range of screen sizes than CRT and plasma displays, with LCD screens available in sizes ranging from tiny digital watches to very large television receivers.

LCDs are available to display arbitrary images (as in a general-purpose computer display) or fixed images with low information content that can be displayed or hidden, such as preset words, digits, and seven-segment displays as in a digital clock. LCDs that display arbitrary images use the same basic technology, except that arbitrary images are made from a matrix of small pixels, while other displays have larger elements. LCDs can either be normally on (positive) or off (negative), depending on the polarizer arrangement. For example, a character positive LCD with a backlight will have black lettering on a background that is the color of the backlight and a character negative LCD will have a black background with the letters being of the same color as the backlight. In white on blue LCDs, optical filters are added to give them their characteristic appearance.

Typically, an LCD is a flat-panel display or other electronically modulated optical device that uses the light-modulating properties of liquid crystals combined with polarizers. Liquid crystals do not emit light directly and instead a backlight or reflector is used to produce images in color or monochrome. Since LCDs produce no light of their own, they require external light to produce a visible image. In a transmissive type of LCD, the light source is provided at the back of a glass stack and is called a backlight. There are several methods of backlighting an LCD panel using LEDs, including the use of either white or red, green, and blue (RGB) LED arrays behind the panel and edge-LED backlighting (e.g., white LEDs around the inside frame of a television and a light-diffusion panel to spread the light evenly behind the LCD panel). A LED-backlit LCD is a display that uses LED backlighting instead of traditional cold cathode fluorescent (CCFL) backlighting.

Currently, most LCD screens are designed with an LED backlight instead of the traditional CCFL backlight and the backlight is dynamically controlled with the video information (dynamic backlight control). The combination of reflective polarizers and prismatic films with the dynamic backlight control can help to increase the dynamic range of the display system. Some LCD backlight systems are made more efficient by applying optical films such as prismatic structure to gain the light into the desired viewer directions and by using reflective polarizing films that recycle the polarized light that was formerly absorbed by the first polarizer of the LCD. These polarizers consist of a large stack of uniaxial oriented birefringent films that reflect the former absorbed polarization mode of the light. Such reflective polarizers typically use uniaxial oriented polymerized liquid crystals (birefringent polymers or birefringent glue).

One trend in LCDs is high dynamic range (HDR). HDR is an emerging technology that enables a user to view relatively good quality images, including higher contrast ratio, darker black state, more gray levels and more vivid colors. There are several formats for HDR including HDR10, Dlby vision, HDR10+, hybrid log-gamma ten (HLG10), PQ10 or PQ format, technicolor advanced HDR, single layer (SL)-HDR1, SL-HDR2, SL-HDR3, and other formats. Displays that can support HDR can usually offer brighter highlights and a wider range of color detail. For an organic light-emitting diode (OLED) display, it is fairly easy to obtain a true black state, but to obtain a brightness over 1000 nits can lead to a compromised lifetime that is unacceptable to most consumers. On the contrary, it is relatively easy to boost an LCD's peak brightness to 1000 nits, but to lower the dark state to less than 0.01 nits is challenging. If a LCD's contrast ratio can be improved, then more grayscales can be displayed. One promising candidate is local dimming.

Most local dimming algorithms split the image frame into corresponding zones that align with the local dimming backlight zones. Once the image has been split into zone segments the brightest pixel is found in each zone. The brightest pixel is used to set the theoretical power level required for that backlight zone as no pixel needs to be brighter than the level of the brightest pixel in that zone. Once the backlight's power level has been determined for a particular zone, then the LCD transparency can be calculated for each pixel in that zone. For a fixed backlight power level, the LCD transparency is changed from almost black to transparent to adjust the amount of light coming through from the backlight. Filters (red, green, and blue) on the LCD filter the light and create the colors for each pixel.

The problem that TCONs suffer when calculating the backlight brightness is that the TCON does not have a full frame buffer to save the whole video frame into, then analyze for the brightest pixel, and then calculate the backlight power and change the transparency. Instead, the TCON only has a few lines of buffer, scanning from the top of the frame to the bottom. By the time the TCON starts painting the screen at the top, the TCON has no idea how bright the following pixels on the same frame will become and thus it is impossible for the TCON to determine what power level to use for the current frame based on data that has not yet been received. So instead, the TCON calculates the backlight power based on the brightest pixel in the corresponding local dimming zone of the previous frame. This means the TCON's knowledge of the most suitable backlight power level is always lagging the actual video by one frame.

The consequence of always being one frame behind is that if the current frame is brighter than the previous frame, any previous calculations would have underestimated the brightness level required of the backlight. This presents a choice of two bad options for the TCON, either to frequently underestimate how bright the next frame will be and to clip the highlights when they get brighter, or to run the backlight brighter than really necessary to provide some margin to allow for the next frame to become brighter without clipping. Utilizing the second of these two options is often why HDR backlights use more power than SDR backlights even when displaying the same content at the same luminance level.

Typically, in current HDR laptops, the backlight is run about fifty percent brighter than necessary. This results in several negative consequences, including having the backlight power consumption being about fifty percent higher than necessary. Also, system battery life is lower, often by about twenty percent to about thirty percent. Further, due to the increased intensity of the backlight, the light leakage through the LCD panel is higher, so blacks are not quite as black as they can get when in SDR mode and for scenarios where local dimming can't be used (e.g., white text on a black background), the contrast ratio of the screen is reduced by about thirty-three percent (33%).

Also, one of the biggest problems for local dimming solutions is the prevention of flicker. The flicker can occur when the LED's are being increased in brightness on the backlight more quickly than the LCD's transparency is being reduced. This creates a flicker or flash in areas that would otherwise be expected to stay a constant luminance. More specifically, the problem is that the backlight is updated synchronously with the video frame, so as each video frame is updated, both the LED backlight, and the LCD would be updated. However, while the LED backlight changes luminance level in 10's or 100's of nanoseconds, the LCD responds almost a million times slower taking 10's of milliseconds. If the backlight transitioned from 20 nits to 700 nits immediately but the LCD does not complete transitioning for 20 milliseconds (ms) due to the slower response time of the LCDs, there will be period where areas of darkness will be as bright as the brightest pixel on the display.

One industry standard test scenario which determines how aggressively a panel will dim the backlight is the VESA DisplayHDR standard where white patches in a black and white checkerboard pattern are dimmed to a signal level of only 5 cd/m2 and the level of the backlight is measured for black patches in the black and white checkerboard pattern. Across a broad spectrum of displays from DisplayHDR 400 to 1400 in both laptops and desktops, the best displays were found to run the backlight three times brighter than necessary, and the worst run the backlight at sixty times brighter than necessary (bearing in mind the target is only 5 cd/m2). The test of the broad spectrum of displays demonstrates the power being wasted by the backlight being driven unnecessarily high, on average across about eighteen times the required backlight power level and instead of running at 5 cd/m2, in the test, the average backlight was running at 90 cd/m2.

More advanced backlight controller chips can be programmed to intentionally delay the ramp of the LED's to make them correspond more similarly with the response speed of the LCD. However, this is a single programmable value that is grossly insufficient to solve the problem because an LCD panel's gray to gray time changes depending upon the starting grey level and ending grey level. What is needed is a system and method to help control the backlight of an LCD screen while allowing for reduced power usage and reduced flicker.

A system and method to help provide asynchronous control of a backlight for a liquid crystal display can resolve these issues (and others). In an example, an electronic device (e.g., electronic device 102) can include a display engine (e.g., the display engine 108) and a display (e.g., the display panel 110). The display engine can support HDR and can include a display engine cache (e.g., the display frame buffer 112). The display panel 110 can include a display backplane (e.g., the display backplane 114), a TCON (e.g., the TCON 116), an LCD panel (e.g., the LCD panel 118), and a backlight (e.g., the backlight 120). The display engine can communicate with the display panel 110 using a display interface (e.g., the display interface 124).

The frame buffer in the display engine can buffer or cache a frame that can be used for calculation of the necessary backlight power levels prior to sending the frame to the TCON. This helps prevent the system from being a frame late on the backlight level calculation and can determine the theoretically optimal backlight power level without needing to apply a safety margin. In addition, the display engine can drive the backlight directly and asynchronously from the display engine rather than delegating to task to the video-frame-rate-synchronous TCON. This allows updates to the backlight to adjust the backlight power level at a one (1) kilohertz (KHz) clock rate, making updates to the backlight every one (1) ms. By updating the backlight power level every one (1) ms, the system can accommodate each of the different gray to gray levels that the various zones across the backlight will be going through, each of them different, so that the system can align the backlight power level to the inverse transparency of the LCD and help to eliminate flicker.

Figure 2:
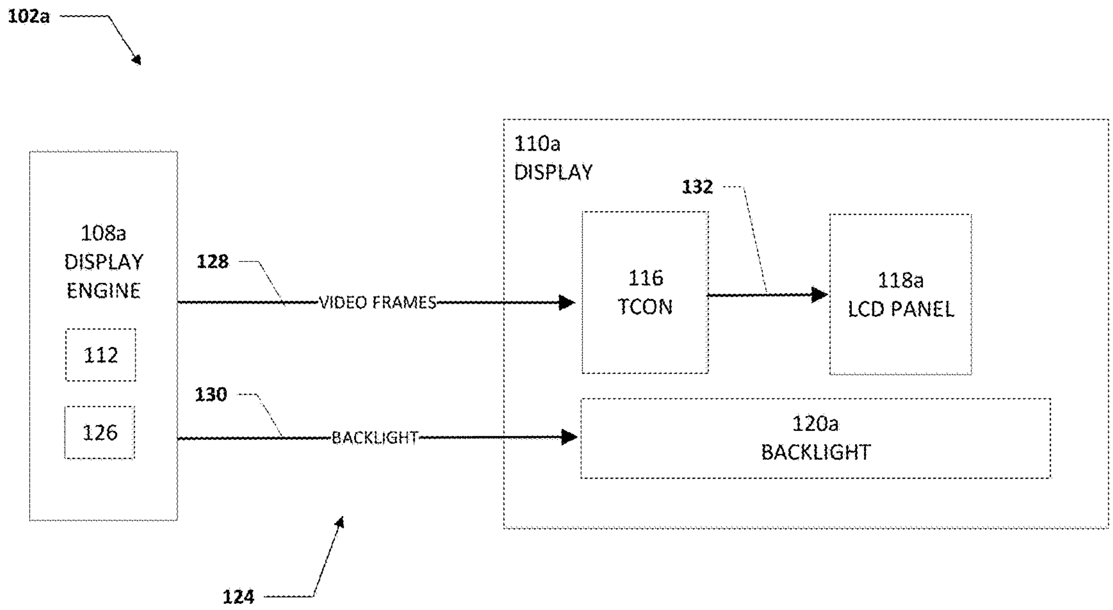
FIG. 2 is a simplified block diagram illustrating example details of a portion of a system to enable asynchronous control of a backlight for a liquid crystal display, in accordance with an embodiment of the present disclosure.

Turning to FIG. 2, FIG. 2 is a simple block diagram illustrating example details of a portion of a system configured to help allow for asynchronous control of a backlight for a liquid crystal display, in accordance with an embodiment of the present disclosure. As illustrated in FIG. 2, an electronic device 102*a* can include a display engine 108*a* and a display panel 110*a*. The display panel 110*a* can support HDR. The display engine 108*a* can include the display frame buffer 112 and a lookup table 126. The display panel 110*a* can include the TCON 116, an LCD panel 118*a*, and a backlight 120*a*. The display engine 108*a* can communicate with the display panel 110*a* using the display interface 124.

The lookup table 126 can include entries related to LCD transparency responds when changing from one gray level to the next gray level. The lookup table 126 can be used by the display engine 108*a* to help determine the timing of increasing or decreasing the backlight relative to LCD transparency response times when changing from one gray level to the next gray level. For example, if the gray to gray transition time is eight (8) ms, then the timing of the increase or decrease of the backlight can be done in eight (8) intervals with one every one (1) ms, or four (4) intervals with one every two (2) ms, or some other interval. The amount the backlight is increased or decreased during each interval can be approximately linear or can be non-linear to match the level of the backlight with the non-linear progression of the gray to gray transition of the LCDs.

The display interface 124 can include a video frames portion 128 and a backlight control portion 130. The video frames portion 128 can include image data for the TCON and the backlight control portion 130 can include backlight control data for the backlight 120*a*. The video frames portion 128 can include video data and video frames to help display an image on the display panel 110*a*. The TCON 116 receives the video data and video frames from the video frames portion 128 of the display interface 124 and uses the individual frames generated by the display engine 108*a*, corrects for color and brightness, controls the refresh rate, controls power savings of display panel 110*a*, touch (if enabled), etc. and communicates a video signal 132 to the LCD panel 118*a*. The LCD panel 118*a* receives the video signal from the TCON 116 and uses the video signal 132 to display an image on display panel 110*a* to the user.

The backlight 120*a* receives the backlight control portion 130 of the display interface 124. The display engine 108*a* uses the backlight control portion 130 to asynchronously control the backlight 120*a* of the display panel 110*a* rather than the TCON 116 being the source of control signals to the backlight 120*a*. Because the display engine 108*a* uses the backlight control portion 130 to asynchronously control the backlight 120*a* of the display panel 110*a*, the backlight can be operated at a higher refresh rate than the video signal to align the LCD and LED response speeds and help prevent flicker while enabling significantly more aggressive application of local dimming.

Figure 3:
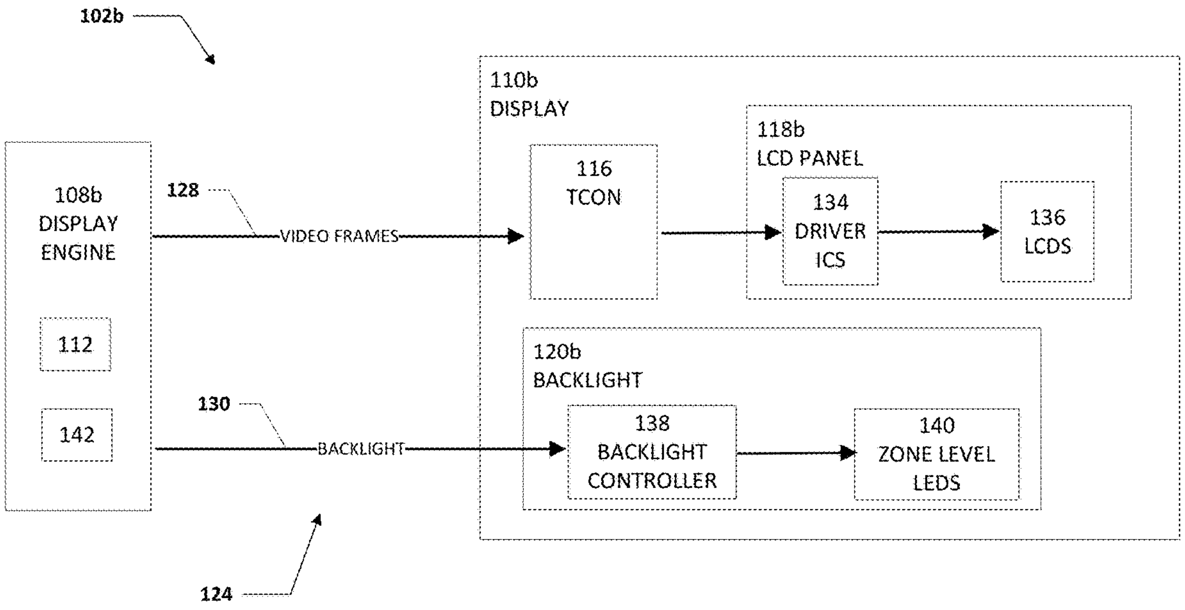
FIG. 3 is a simplified block diagram illustrating example details of a portion of a system to enable asynchronous control of a backlight for a liquid crystal display, in accordance with an embodiment of the present disclosure.

Turning to FIG. 3, FIG. 3 is a simple block diagram illustrating example details of a portion of a system configured to help allow for asynchronous control of a backlight for a liquid crystal display, in accordance with an embodiment of the present disclosure. As illustrated in FIG. 3, an electronic device 102*b* can include a display engine 108*b* and a display panel 110*b*. The display engine 108*b* can include the display frame buffer 112 and a backlight response time adjustment engine 142. The display panel 110*b* can include the TCON 116, an LCD panel 118*b*, and a backlight 120*b*. The LCD panel 118*b* can include driver integrated circuits 134 and LCDs 136. The backlight 120*b* can include a backlight controller 138 and zone level LEDs 140. The display engine 108*a* can communicate with the display panel 110*a* using the display interface 124.

The backlight response time adjustment engine 142 can be used to determine LCD transparency responds when changing from one gray level to the next gray level. The backlight response time adjustment engine 142 can be used by the display engine 108*a* to help determine the timing of increasing or decreasing the backlight relative to LCD transparency response times when changing from one gray level to the next gray level. For example, if the gray to gray transition time is 10 (10) ms, then the timing of the increase or decrease of the backlight can be done in ten (10) intervals with one every one (1) ms, in five (5) intervals with one every two (2) ms, or two (2) intervals with one every five (5) ms, or some other interval. The amount the backlight is increased or decreased during each interval can be approximately linear or can be non-linear to match the level of the backlight with the non-linear progression of the gray to gray transition of the LCDs.

The display interface 124 can include the video frames portion 128 and the backlight control portion 130. The video frames portion 128 can include video data and video frames to help display an image on the display panel 110*b*. The TCON 116 receives the video data and video frames from the video frames portion 128 of the display interface 124 and uses the individual frames generated by the display engine 108*b*, corrects for color and brightness, controls the refresh rate, controls power savings of the display panel 110*a*, touch (if enabled), etc. and communicates a video signal 132 to the driver integrated circuits 134 in the LCD panel 118*b*. The driver integrated circuits 134 in the LCD panel 118*b* receive the video signal from the TCON 116 and uses the video signal 132 to control each of the LCDs 136 by applying a specific voltage to twist each LCD in the LCDs 136 to display an image on the display panel 110*b* to the user.

The backlight controller 138 in the backlight 120*b* receives the backlight control portion 130 of the display interface 124. The backlight controller 138 uses the backlight control portion 130 of the display interface 124 to control LEDs that generate the backlight. In an example, the LEDs that generate the backlight are divided into a plurality of zones and the backlight control portion 130 can control each of the zone level LEDs 140.

The display engine 108*b* uses the backlight control portion 130 to asynchronously control each of the zone level LEDs 140 in the backlight 120*b* of the display panel 110*b* rather than the TCON 116 being the source of control signals to the backlight 120*b*. Because the display engine 108*b* uses the backlight control portion 130 to asynchronously control each of the zone level LEDs 140 in the backlight 120*b* of the display panel 110*b*, the backlight can be operated at a higher refresh rate than the video signal to align the LCD and LED response speeds and help prevent flicker while enabling significantly more aggressive application of local dimming. Also, because the LEDs that generate the backlight are divided into a plurality of zones and the backlight control portion 130 can control each of the zone level LEDs 140, areas of the backlight can be dimmed to reduce power consumption, even if some other areas are at or near full brightness. By asynchronously controlling each of the zone level LEDs 140, power can be saved while still providing good contrast by enabling significantly more aggressive application of local dimming and avoiding flicker.

Figure 4:
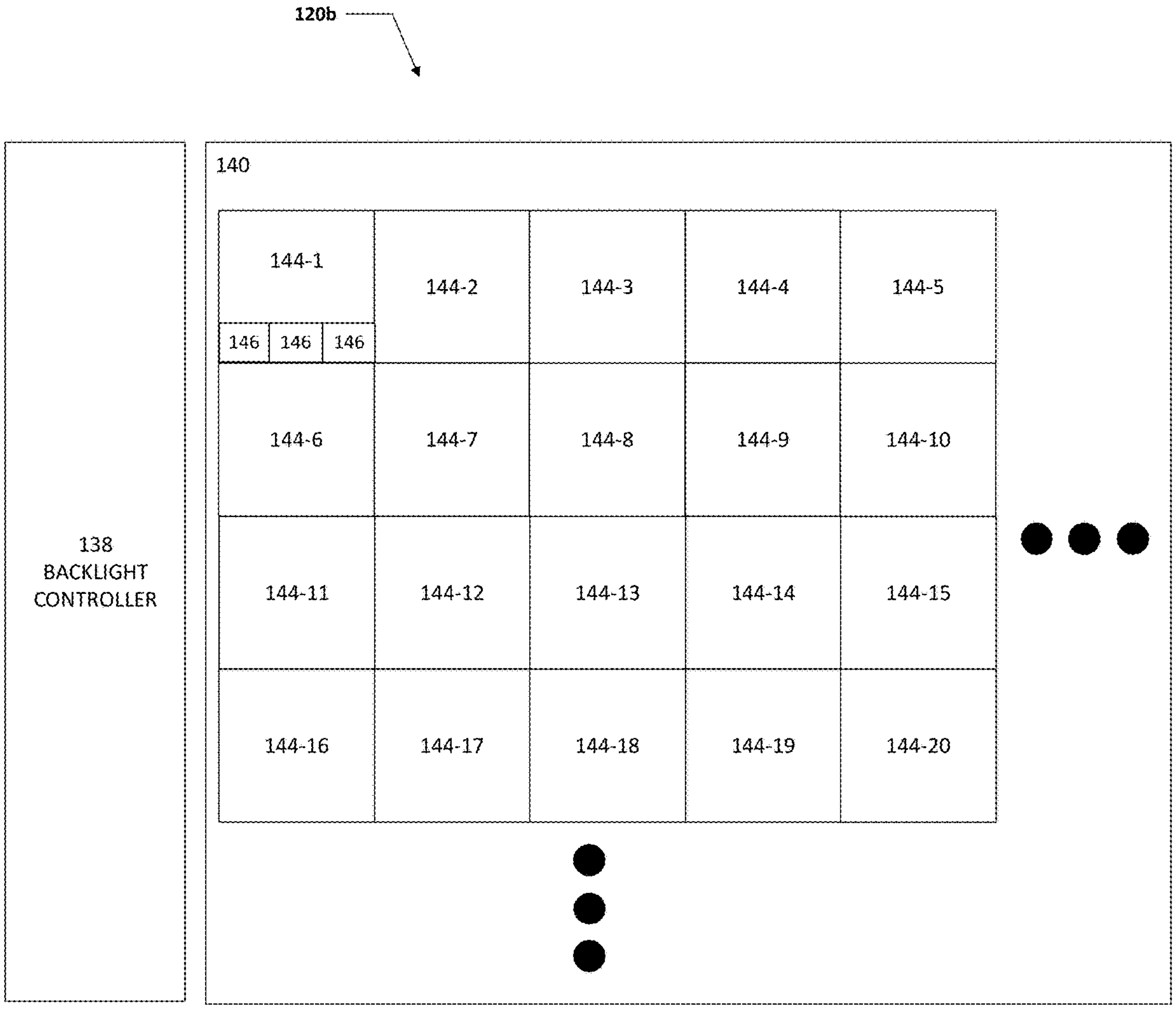
FIG. 4 is a simplified block diagram illustrating example details of a portion of a system to enable asynchronous control of a backlight for a liquid crystal display, in accordance with an embodiment of the present disclosure.

Turning to FIG. 4, FIG. 4 is a simple block diagram illustrating example details of a portion of a system configured to help allow for asynchronous control of a backlight for a liquid crystal display, in accordance with an embodiment of the present disclosure. As illustrated in FIG. 4, the backlight 120*b* of the display panel 110*b* (not shown) can include the backlight controller 138 and the zone level LEDs 140. The zone level LEDs 140 can include a plurality of zones 144. For example, FIG. 4 illustrates zones 144-1 through 144-20. Is should be noted that the zone level LEDs 140 can include more zones 144 or fewer zones 144 depending on design constraints and design choice. In addition, the shape of the zone level LEDs 140 does not need to be a rectangular profile or square profile and can be any shape or profile depending on design constraints and design choice. For example, if a display panel that included the zone level LEDs 140 had a round or circular shape or profile, then the zone level LEDs 140 could have a round or circular shape or profile. As one skilled in the art would recognize, the backlight 120*b* is behind the LCD panel 118*b* and each of the LCDs 136 would be in one of the zones 144-1 through 144-20.

Each of the zones 144 in the zone level LEDs 140 can include one or more LEDs 146. When activated, the LEDs 146 create the backlight for the display panel 110*b*. Because the display engine 108*b* uses the backlight control portion 130 to asynchronously control each of the zone level LEDs 140, or more specifically each zone 144, in the backlight 120*b* of the display panel 110*b*, the backlight can be operated at a higher refresh rate than the video signal and help to align the LCD and LED response speeds and help to prevent flicker while enabling a significantly more aggressive application of local dimming as compared to some current systems. Also, because the LEDs 146 that generate the backlight are divided into a plurality of the zones 144 and the backlight control portion 130 can control each of the LEDs 146 in the zones 144, areas of the backlight can be dimmed to reduce power consumption, even if some areas are at or near full brightness. By asynchronously controlling each of the LEDs 146 in the zones 144 of the zone level LEDs 140, power can be saved while still providing good contrast by enabling significantly more aggressive application of local dimming and avoiding flicker.

Turning to FIG. 5, FIG. 5 is a simple block diagram illustrating example details of a lookup table to help allow for asynchronous control of a backlight for a liquid crystal display, in accordance with an embodiment of the present disclosure. As illustrated in FIG. 5, the lookup table 126 can include example times in milliseconds of how long it would take for a specific the gray to gray transition of an LCD panel. Each LCD panel can have a specific lookup table 126 because the gray to gray transition time of a specific LCD panel can be unique to that LCD panel. The lookup table 126 can be used by a display engine that includes the lookup table 126 (e.g., the display engine 108*a*) to help determine the timing of increasing or decreasing the backlight relative to LCD transparency response times when changing from one gray level to the next gray level.

A different lookup table can be created for each different LCD panel as the gray to gray transition time of a specific LCD panel can unique to that LCD panel. Typically, the gray to gray transition time is not linear. More specifically, the gray to gray transition time for an LCD panel is typically a quasi "S" curve or hockey stick curve with the first part of the transition being relatively short or quick while the last part of the transition can be relatively slow.

Figure 6:
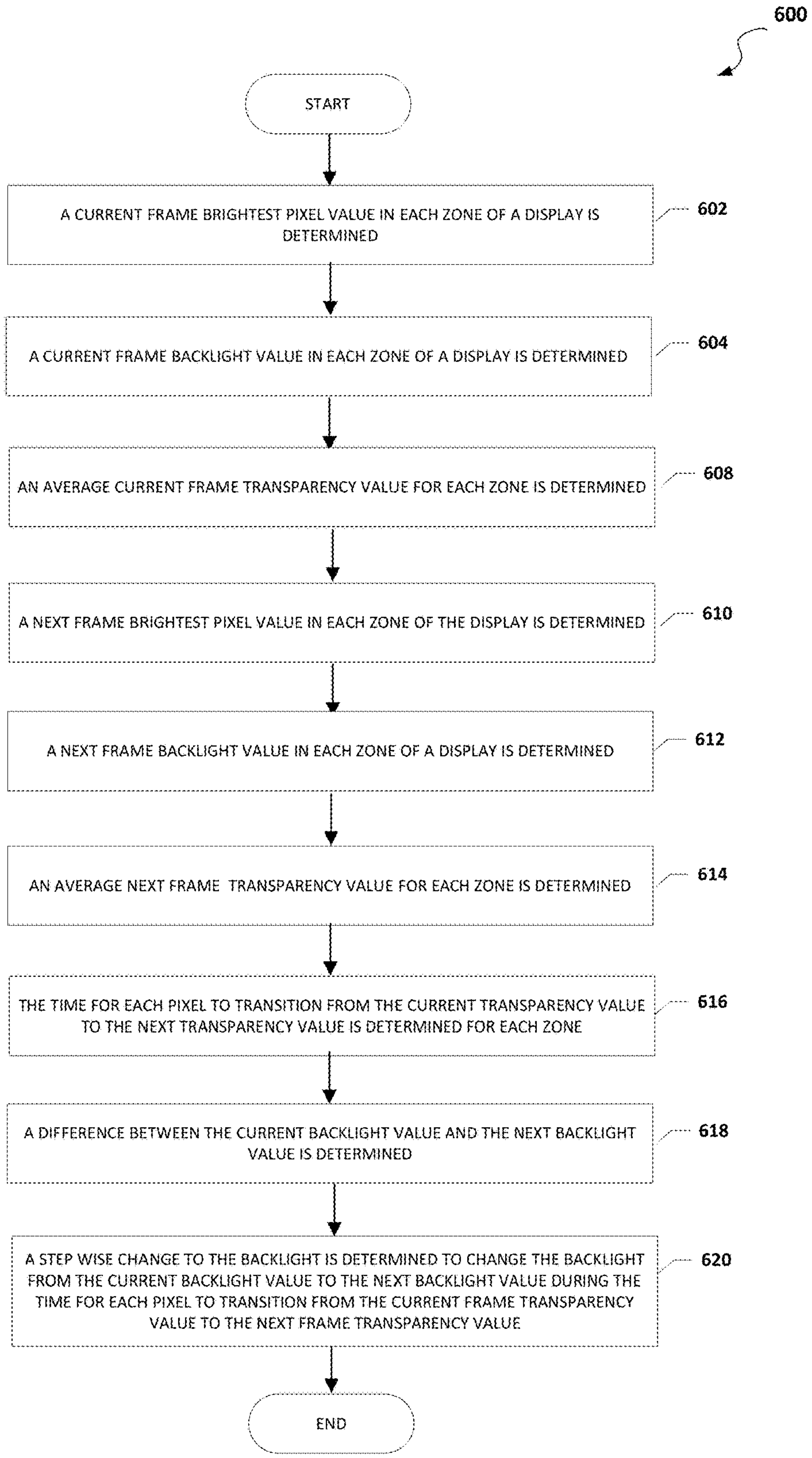
FIG. 6 is a simplified flowchart illustrating potential operations that may be associated with the system in accordance with an embodiment of the present disclosure.

Turning to FIG. 6, FIG. 6 is an example flowchart illustrating possible operations of a flow 600 that may be associated with asynchronous control of a backlight for a liquid crystal display, in accordance with an embodiment. In an embodiment, one or more operations of flow 600 may be performed by the display engine 108, the TCON 116, the LCD panel, the backlight, 120*b*, the lookup table 126, and/or the backlight response time adjustment engine 142. At 602, a current frame brightest pixel value in each zone of a display is determined. For example, for a current frame the display engine 108 sent to the TCON 116 to cause an image to be displayed to the user, for each zone 144 (e.g., zones 144-1 through 144-20) in the display panel 110*b*, a current brightest pixel value of the LCDs 136 can be determined. At 604, a current frame backlight value in each zone of a display is determined. For example, for each zone 144 (e.g., zones 144-1 through 144-20) in the zone level LEDs 140, a current backlight value of the LEDs 146 in each zone is determined. At 608, an average current frame transparency value for each zone is determined. The current transparency value is the starting gray level of the gray to gray transition.

At 610, a next frame brightest pixel value in each zone of a display is determined. For example, for each zone 144 (e.g., zones 144-1 through 144-20) in the display panel 110*b*, a brightest pixel value of the LCDs 136 in the next frame of video data the display engine 108 will send to the TCON 116 to cause an image to be displayed to the user can be determined. At 612, a next frame backlight value in each zone of a display is determined. For example, for each zone 144 (e.g., zones 144-1 through 144-20) in the zone level LEDs 140, a next frame backlight value of the LEDs 146 in each zone is determined. At 614, an average next frame transparency value for each zone is determined. The next frame transparency value is the ending gray level of the gray to gray transition.

At 616, the time for each pixel to transition from the current transparency value to the next transparency value is determined for each zone. For example, the display engine 108 can use the lookup table 126 and determine a gray to gray transition time based on the current transparency value determined at 608 and the next frame transparency value determined in 614 to help determine the LCD transparency response times when changing from one gray level to the next gray level. In another example, the backlight response time adjustment engine 142 can be used by the display engine 108 to help determine the LCD transparency response times when changing from one gray level to the next gray level. At 618, a difference between the current backlight value and the next backlight value is determined. At 620, a stepwise change to the backlight is determined to change the backlight from the current backlight value to the next backlight value during the time for each pixel to transition from the current frame transparency value to the next frame transparency value. For example, if the backlight needs to change from one hundred (100) nits to one hundred and eighty (180) nits and the gray to gray transition time (based on the lookup table 126) is eight (8) ms, the system may use eight (8) steps a one (1) ms intervals. The amount the backlight changes in each of the eight (8) steps may be the same amount (e.g., 10 nits each step) or may be a different amount each step (e.g., 20 nits in the first step, 15 nits in the second step, 8 nits in the third step, 6 in the fourth step, etc.). The transition from the current frame transparency value to the next frame transparency value is a progressive transition and large steps (increases or decreases) in the backlight may produce a flicker but if the steps are at one (1) ms or one (1) Khz, the flicker would not be obvious to the user. Note that the steps do not need to be at one (1) ms intervals and can be at any interval that will allow the backlight to change during the determined gray to gray transition time and not produce a noticeable or obvious flicker to the user.

Figure 7:
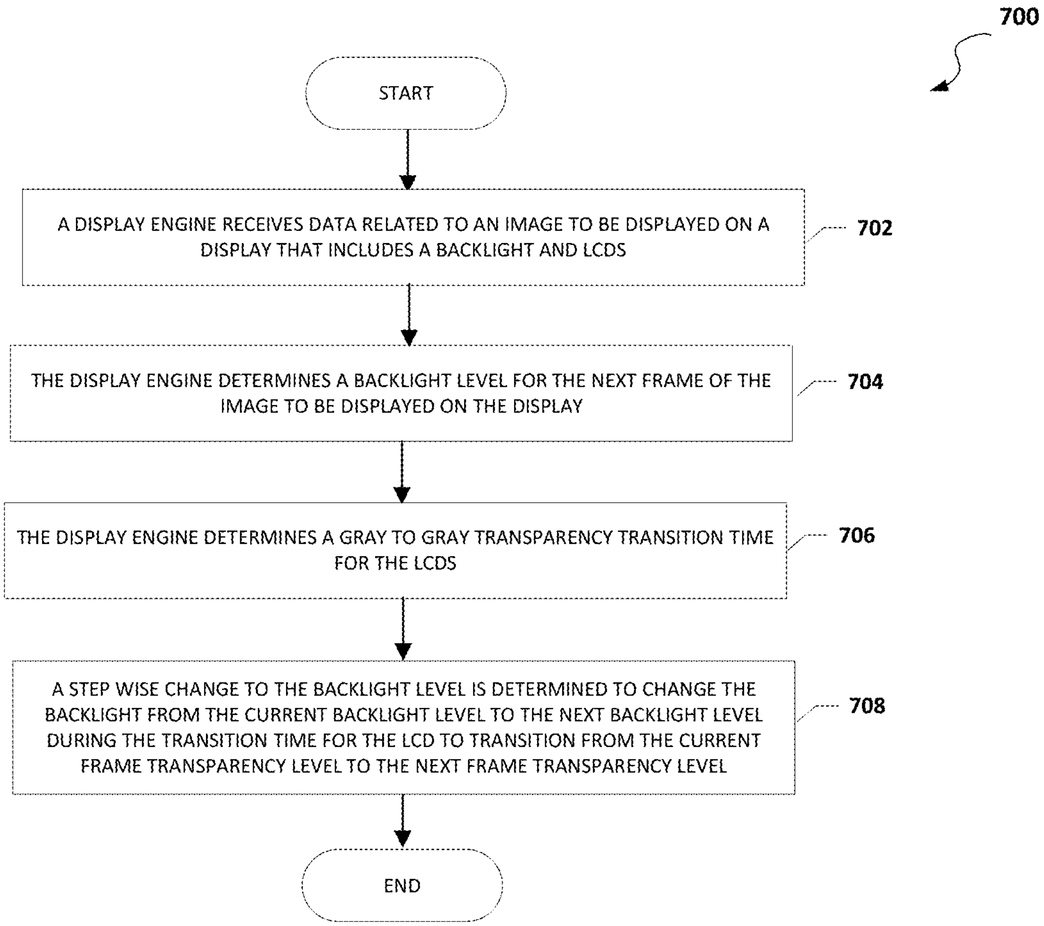
FIG. 7 is a simplified flowchart illustrating potential operations that may be associated with the system in accordance with an embodiment of the present disclosure.

Turning to FIG. 7, FIG. 7 is an example flowchart illustrating possible operations of a flow 700 that may be associated with asynchronous control of a backlight for a liquid crystal display, in accordance with an embodiment. In an embodiment, one or more operations of flow 700 may be performed by the display engine 108, the TCON 116, the LCD panel, the backlight, 120*b*, the lookup table 126, and/or the backlight response time adjustment engine 142. At 702, a display engine receives data related to an image to be displayed on a display that includes a backlight and LCDs. At 704, the display engine determines a backlight level for the next frame of the image to be displayed on the displays. At 706, the display engine determines a gray to gray transparency transition time for the LCDs. At 708, a step wise change to the backlight level is determined to change the backlight form the current backlight level to the next backlight level during the transition time for the LCDs to transition from the current frame transparency level to the next frame transparency level.

Figure 8:
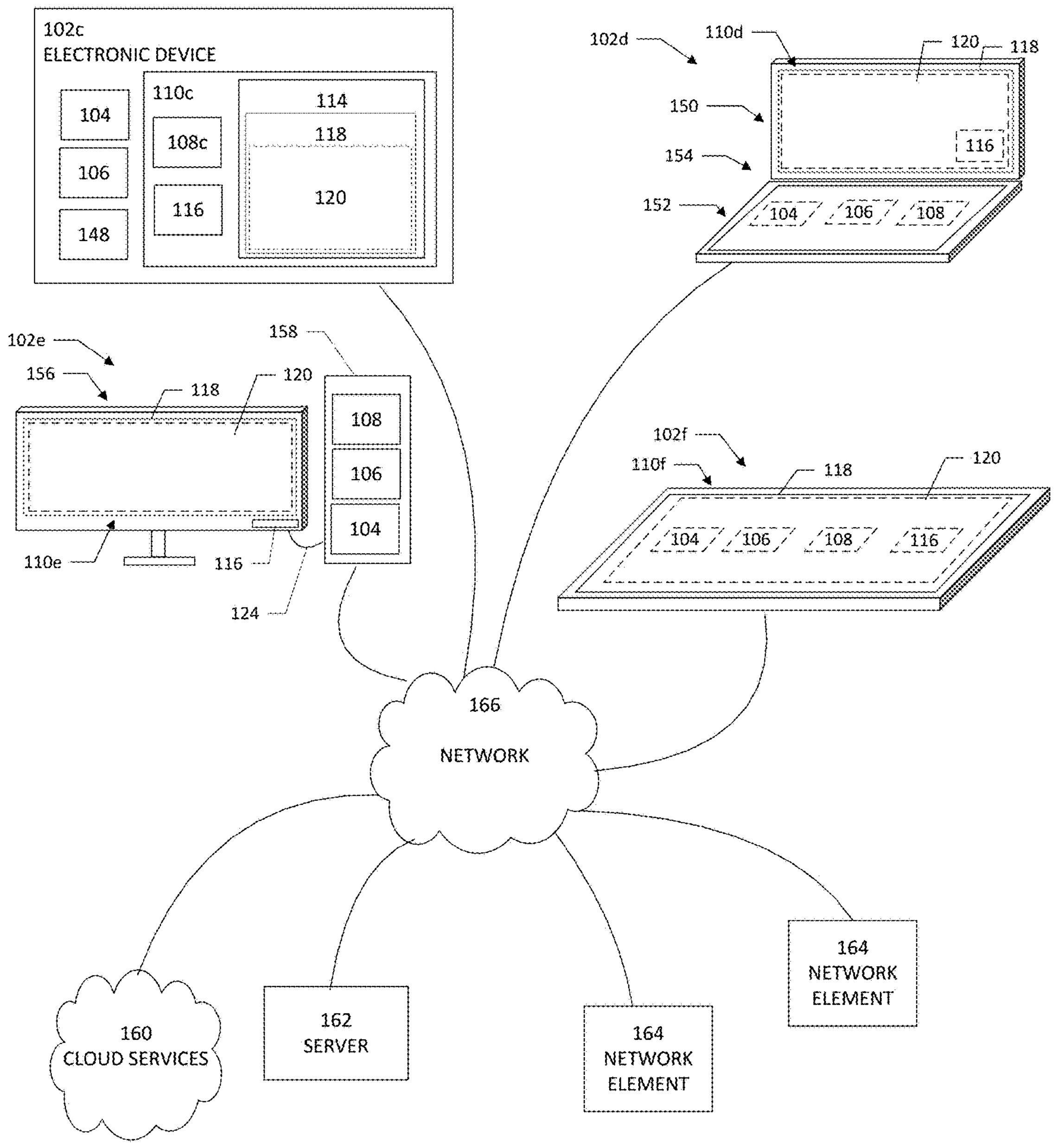
FIG. 8 is a simplified block diagram of an electronic device that includes a system to enable asynchronous control of a backlight for a liquid crystal display, in accordance with an embodiment of the present disclosure.

Turning to FIG. 8, FIG. 8 is a simplified block diagram of example electronic devices 102*c*-102*f* configured to enable asynchronous control of a backlight for a liquid crystal display, in accordance with an embodiment of the present disclosure. In an example, an electronic device 102*c* can include memory 104, one or more processors 106, a display panel 110*c*, and a graphics processing unit (GPU) 148. The display panel 110*c* can include a display engine 108*c*, the display backplane 114, the TCON 116, the LCD panel 118, and the backlight 120. The GPU 148 can communicate with the display engine 108*c* and the display engine 108*c* can communicate with the TCON 116 and the backlight 120. More specifically, the display engine 108*c* can receive video data from the GPU 148 and communicate the video frames portion 128 to the TCON 116 and the backlight control portion 130 to the backlight 120.

An electronic device 102*d* can include a first housing 150 and a second housing 152. The first housing 150 is rotatably or pivotable coupled to the second housing 152 using a hinge 154. The first housing 150 can include a display panel 110*d*, the TCON 116, the LCD panel 118, and the backlight 120. The second housing 152 can include the memory 104, the one or more processors 106, and the display engine 108. In some examples, the display engine 108 can be located in the first housing 150. The display engine 108 can communicate the video frames portion 128 to the TCON 116 and the backlight control portion 130 to the backlight 120.

An electronic device 102*e* can include a display monitor 156 and a computing housing 158. The display monitor 156 can be a desktop display monitor, a wall hanging monitor, or some other type of display monitor. The display monitor 156 can include the display panel 110*e*, the TCON 116, the LCD panel 118, and the backlight 120. The computing housing 158 may be a computer tower, small factor form computer housing, or some other type of computer housing. The computing housing 158 can include the memory 104, the one or more processors 106, and the display engine 108. The display engine 108 can communicate the video frames portion 128 to the TCON 116 and the backlight control portion 130 to the backlight 120 using the display interface 124. In some examples, the display engine 108 can be located in the display monitor 156.

An electronic device 102*f* can include the memory 104, the one or more processors 106, the display engine 108, display panel 110*f*, the TCON 116, the LCD panel 118, and the backlight 120. The display engine 108 can communicate the video frames portion 128 to the TCON 116 and the backlight control portion 130 to the backlight 120. In some examples, the electronic device 102*f* can be a tablet computer or standalone display.

In an example, each of electronic devices 102*c*-102*f* (and electronic devices 102, 102*a*, and 102*b*, not shown) may be in communication with each other, cloud services 160, a server 162 and/or one or more network elements 164 using a network 166. In other examples, one or more of electronic devices 102*c*-102*f* (and electronic devices 102, 102*a*, and 102*b*, not shown) may be a standalone device and not in communication with the network 166. The network 166 represents a series of points or nodes of interconnected communication paths for receiving and transmitting packets of information. The network 166 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In the network 166, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Messages through the network could be made in accordance with various network protocols, (e.g., Ethernet, Infiniband, OmniPath, etc.). Additionally, radio signal communications over a cellular network may also be provided. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks.

In an example implementation, the electronic devices 102 and 102*a*-102*f* are meant to encompass a computer, a personal digital assistant (PDA), a laptop or electronic notebook, hand held device, a cellular telephone, a smartphone, an IP phone, wearables, network elements, network appliances, servers, routers, switches, gateways, bridges, load balancers, processors, modules, or any other device, component, element, or object that includes an LCD panel and a backlight. Each of electronic devices 102 and 102*a*-102*f* may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Each of the electronic devices 102 and 102*a*-102*f* may include virtual elements.

In regards to the internal structure, each of the electronic devices 102 and 102*a*-102*f* can include memory elements for storing information to be used in operations. Each of the electronic devices 102 and 102*a*-102*f* may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received could be provided in any database, register, queue, table, cache, control list, or other storage structure, all of which can be referenced at any suitable timeframe. Any such storage options may also be included within the broad term 'memory element' as used herein.

In certain example implementations, functions may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for operations. This includes the memory elements being able to store software, logic, code, or processor instructions that are executed to carry out operations or activities.

In an example implementation, elements of the electronic devices 102 and 102*a*-102*f* may include software modules (e.g., display engine 108, TCON 116, etc.) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of the electronic devices 102 and 102*a*-102*f* can include one or more processors that can execute software or an algorithm. In one example, the processors could transform an element or an article (e.g., data) from one state or thing to another state or thing. In another example, activities may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an ASIC that includes digital logic, software, code, electronic instructions, or any suitable combination thereof. Any of the potential processing elements, modules, and machines described herein should be construed as being encompassed within the broad term 'processor.'

Implementations of the embodiments disclosed herein may be formed or carried out on or over a substrate, such as a non-semiconductor substrate or a semiconductor substrate. In one implementation, the non-semiconductor substrate may be silicon dioxide, an inter-layer dielectric composed of silicon dioxide, silicon nitride, titanium oxide and other transition metal oxides. Although a few examples of materials from which the non-semiconducting substrate may be formed are described here, any material that may serve as a foundation upon which a non-semiconductor device may be built falls within the spirit and scope of the embodiments disclosed herein.

In another implementation, the semiconductor substrate may be a crystalline substrate formed using a bulk silicon or a silicon-on-insulator substructure. In other implementations, the semiconductor substrate may be formed using alternate materials, which may or may not be combined with silicon, that include but are not limited to germanium, indium antimonide, lead telluride, indium arsenide, indium phosphide, gallium arsenide, indium gallium arsenide, gallium antimonide, or other combinations of group III-V or group IV materials. In other examples, the substrate may be a flexible substrate including 2D materials such as graphene and molybdenum disulphide, organic materials such as pentacene, transparent oxides such as indium gallium zinc oxide poly/amorphous (low temperature of dep) III-V semiconductors and germanium/silicon, and other non-silicon flexible substrates. Although a few examples of materials from which the substrate may be formed are described here, any material that may serve as a foundation upon which a semiconductor device may be built falls within the spirit and scope of the embodiments disclosed herein.

It is also important to note that the operations in the preceding diagrams illustrates only some of the possible scenarios and patterns that may be executed by, or within, the electronic devices 102 and 102*a*-102*f*. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the electronic devices 102 and 102*a*-102*f* in that any suitable arrangements, chronologies, configurations, and timing mechanisms may be provided without departing from the teachings of the present disclosure.

Note that with the examples provided herein, interaction may be described in terms of one, two, three, or more elements. However, this has been done for purposes of clarity and example only. In certain cases, it may be easier to describe one or more of the functionalities by only referencing a limited number of elements. It should be appreciated that the electronic devices 102 and 102*a*-102*f* and their teachings are readily scalable and can accommodate a large number of components, as well as more complicated/sophisticated arrangements and configurations. Accordingly, the examples provided should not limit the scope or inhibit the broad teachings of the electronic devices 102 and 102*a*-102*f* and as potentially applied to a myriad of other architectures.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although the electronic devices 102 and 102*a*-102*f* have been illustrated with reference to particular elements and operations, these elements and operations may be replaced by any suitable architecture, protocols, and/or processes that achieve the intended functionality of the electronic devices 102 and 102*a*-102*f*. For example, one skilled in the art could modify a TCON to include the display engine by increasing the TCON buffer to a full frame buffer and other modifications to enable asynchronous control of a backlight in accordance with an embodiment of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

In Example A1, an electronic device can include a liquid crystal display, a timing controller (TCON), a backlight for the liquid crystal display, a backlight controller, and a display engine, where the display engine asynchronously communicates image data to the TCON and backlight control data to the backlight controller.

In Example A2, the subject matter of Example A1 can optionally include where a level of the backlight is updated two or more times during one frame update.

In Example A3, the subject matter of Example A1 can optionally include where a lookup table is used to determine a gray to gray transition time for the liquid crystal display and the gray to gray transition time is used to help determine an interval of increasing or decreasing a level of the backlight during the gray to gray transition time.

In Example A4, the subject matter of Example A3 can optionally include where the interval is one millisecond.

In Example A5, the subject matter of Example A3 can optionally include where the lookup table includes a response time for a plurality of gray to gray transitions for the liquid crystal display.

In Example A6, the subject matter of Example A1 can optionally include where the display engine is located in a graphics processing unit.

In Example A7, the subject matter of Example A1 can optionally include where the display engine is located outside of the TCON.

In Example A8, the subject matter of Example A1 can optionally include where the liquid crystal display and the backlight are divided into a plurality of zones.

In Example A9, the subject matter of any one of Examples A1-A2 can optionally include where a lookup table is used to determine a gray to gray transition time for the liquid crystal display and the gray to gray transition time is used to help determine an interval of increasing or decreasing a level of the backlight during the gray to gray transition time.

In Example A10, the subject matter of any one of Examples A1-A3 can optionally include where the interval is one millisecond.

In Example A11, the subject matter of any one of Examples A1-A4 can optionally include where the lookup table includes a response time for a plurality of gray to gray transitions for the liquid crystal display.

In Example A12, the subject matter of any one of Examples A1-A5 can optionally include where the display engine is located in a graphics processing unit.

In Example A13, the subject matter of any one of Examples A1-A6 can optionally include where the display engine is located outside of the TCON.

In Example A14, the subject matter of any one of Examples A1-A7 can optionally include where the liquid crystal display and the backlight are divided into a plurality of zones.

Example M1 is a method including determining a gray to gray transition and a gray to gray transition time for a liquid crystal display, determining a backlight level adjustment for a backlight, communicating, from a display engine, video data to a timing controller (TCON), where the video data includes instructions for the gray to gray transition for the liquid crystal display, and communicating, from the display engine, the backlight level adjustment to a backlight controller.

In Example M2, the subject matter of Example M1 can optionally include where the backlight is adjusted two or more times during the gray to gray transition time for the liquid crystal display.

In Example M3, the subject matter of Example M1 can optionally include where the backlight is adjusted in one millisecond intervals during the gray to gray transition time for the liquid crystal display.

In Example M4, the subject matter of Example M1 can optionally include where the gray to gray transition time for the liquid crystal display is determined by using a lookup table.

In Example M5, the subject matter of Example M1 can optionally include where the display engine is located in a graphics processing unit.

In Example, M6, the subject matter of Example M1 can optionally include where the display engine and the backlight controller are located outside of the TCON.

In Example M7, the subject matter of any one of the Examples M1-M2 can optionally include where the backlight is adjusted in one millisecond intervals during the gray to gray transition time for the liquid crystal display.

In Example M8, the subject matter of any one of the Examples M1-M3 can optionally include where the gray to gray transition time for the liquid crystal display is determined by using a lookup table.

In Example M9, the subject matter of any one of the Examples M1-M4 can optionally include where the display engine is located in a graphics processing unit.

In Example, M10, the subject matter of any one of the Examples M1-M5 can optionally include where the display engine and the backlight controller are located outside of the TCON.

Example AA1 is an electronic device including a display pane and a display engine located outside of the display panel. The display panel includes a liquid crystal display, a backlight for the liquid crystal display, and a timing controller (TCON). The display engine communicates image data to the TCON and backlight control data to the backlight.

In Example AA2, the subject matter of Example AA1 can optionally include where the display engine is located in a graphics processing unit.

In Example AA3, the subject matter of Example AA1 can optionally include where a level of the backlight is adjusted two or more times during one frame update.

In Example AA4, the subject matter of Example AA1 can optionally include where the electronic device further comprises a lookup table that includes a response time for a plurality of gray to gray transitions for the liquid crystal display. The lookup table is used to help determine a specific gray to gray transition time for the liquid crystal display.

In Example AAS, the subject matter of Example AA4 can optionally include where the backlight is adjusted in one millisecond intervals during the gray to gray transition time for the liquid crystal display.

In Example AA6, the subject matter of Example AA1 can optionally include where the display panel can support high dynamic range.

In Example AA7, the subject matter of any one of Examples AA1-AA2 can optionally include where a level of the backlight is adjusted two or more times during one frame update.

In Example AA8, the subject matter of any one of Examples AA1-AA3 can optionally include where the electronic device further comprises a lookup table that includes a response time for a plurality of gray to gray transitions for the liquid crystal display. The lookup table is used to help determine a specific gray to gray transition time for the liquid crystal display.

In Example AA9, the subject matter of any one of Examples AA1-AA4 can optionally include where the backlight is adjusted in one millisecond intervals during the gray to gray transition time for the liquid crystal display.

In Example AA10, the subject matter of any one of Examples AA1-AA5 can optionally include where the display panel can support high dynamic range.

Example S1 is a system for to synchronized a video stream of a display panel with the video stream of a display engine, the system including means for determining a gray to gray transition and a gray to gray transition time for a liquid crystal display, means for determining a backlight level adjustment for a backlight, means for communicating, from a display engine, video data to a timing controller (TCON), where the video data includes instructions for the gray to gray transition for the liquid crystal display and means for communicating, from the display engine, the backlight level adjustment to a backlight controller.

In Example S2, the subject matter of Example S1 can optionally include where the backlight is adjusted two or more times during the gray to gray transition time for the liquid crystal display.

In Example S3, the subject matter of Example S1 can optionally include where the backlight is adjusted in one millisecond intervals during the gray to gray transition time for the liquid crystal display.

In Example S4, the subject matter of Example S1 can optionally include where the gray to gray transition time for the liquid crystal display is determined by using a lookup table.

In Example S5, the subject matter of Example S1 can optionally include where the display engine is located in a graphics processing unit.

In Example S6, the subject matter of Example S1 can optionally include where the display engine and the backlight controller are located outside of the TCON.

In Example S7, the subject matter of any one of the Examples S1-S2 can optionally include where the backlight is adjusted in one millisecond intervals during the gray to gray transition time for the liquid crystal display.

In Example S8, the subject matter of any one of the Examples S1-S3 can optionally include where the gray to gray transition time for the liquid crystal display is determined by using a lookup table.

In Example S9, the subject matter of any one of the Examples S1-S4 can optionally include where the display engine is located in a graphics processing unit.

In Example S10, the subject matter of any one of the Examples S1-S5 can optionally include where the display engine and the backlight controller are located outside of the TCON.

Example X1 is a machine-readable storage medium including machine-readable instructions to implement a method or realize an apparatus as in any one of the Examples A1-A14, M1-M10, AA1-AA10, or S1-S10. Example Y1 is an apparatus comprising means for performing any of the Example methods M1-M10. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. An electronic device comprising:

a liquid crystal display;

a timing controller (TCON);

a backlight for the liquid crystal display;

a backlight controller; and a display engine configured to communicate, image data to the TCON, and asynchronously communicate backlight control data to the backlight controller directly, thereby bypassing the TCON.

2. The electronic device of claim 1, wherein a level of the backlight is updated two or more times during one frame update.

3. The electronic device of claim 1, wherein a lookup table is used to determine a gray to gray transition time for the liquid crystal display and the gray to gray transition time is used to help determine an interval of increasing or decreasing a level of the backlight during the gray to gray transition time.

4. The electronic device of claim 3, wherein the interval is one millisecond.

5. The electronic device of claim 3, wherein the lookup table includes a response time for a plurality of gray to gray transitions for the liquid crystal display.

6. The electronic device of claim 1, wherein the display engine is located in a graphics processing unit.

7. The electronic device of claim 1, wherein the display engine is located outside of the TCON.

8. The electronic device of claim 1, wherein the liquid crystal display and the backlight are divided into a plurality of zones.

9. A method comprising:
determining a gray to gray transition and a gray to gray transition time for a liquid crystal display;
determining a backlight level adjustment for a backlight;
communicating, from a display engine, video data to a timing controller (TCON), wherein the video data includes instructions for the gray to gray transition for the liquid crystal display; and
asynchronously communicating, from the display engine, the backlight level adjustment to a backlight controller directly, thereby bypassing the TCON.

10. The method of claim 9, wherein the backlight is adjusted two or more times during the gray to gray transition time for the liquid crystal display.

11. The method of claim 9, wherein the backlight is adjusted in one millisecond intervals during the gray to gray transition time for the liquid crystal display.

12. The method of claim 9, wherein the gray to gray transition time for the liquid crystal display is determined by using a lookup table.

13. The method of claim 9, wherein the display engine is located in a graphics processing unit.

14. The method of claim 9, wherein the display engine and the backlight controller are located outside of the TCON.

15. An electronic device comprising:
a display panel, wherein the display panel includes:
a liquid crystal display;
a backlight for the liquid crystal display;
a timing controller (TCON); and
a display engine located outside of the display panel, and configured to communicate image data to the TCON, and asynchronously communicate backlight control data to the backlight directly, thereby bypassing the TCON.

16. The electronic device of claim 15, wherein the display engine is located in a graphics processing unit.

17. The electronic device of claim 15, wherein a level of the backlight is adjusted two or more times during one frame update.

18. The electronic device of claim 15, wherein the electronic device further comprises:
a lookup table that includes a response time for a plurality of gray to gray transitions for the liquid crystal display, wherein the lookup table is used to help determine a specific gray to gray transition time for the liquid crystal display.

19. The electronic device of claim 18, wherein the backlight is adjusted in one millisecond intervals during the gray to gray transition time for the liquid crystal display.

20. The electronic device of claim 15, wherein the display panel can support high dynamic range.

* * * * *